(12) United States Patent
McGlone

(10) Patent No.: US 6,724,192 B1
(45) Date of Patent: *Apr. 20, 2004

(54) METHOD AND APPARATUS FOR EXPLORATION USING GMR SENSORS

(75) Inventor: T. David McGlone, P.O. Box 169, 1011 4th St. #1, Golden, CO (US) 80403

(73) Assignee: T. David McGlone, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/457,108

(22) Filed: Dec. 7, 1999

Related U.S. Application Data

(63) Continuation of application No. 08/926,561, filed on Sep. 10, 1997.

(51) Int. Cl.[7] .............................. G01V 3/00; G01V 3/08; G01R 33/04
(52) U.S. Cl. ....................................... 324/345; 324/348
(58) Field of Search ................... 324/252, 330, 324/331, 345, 346, 347, 348, 354, 323, 349, 350, 225

(56) References Cited

U.S. PATENT DOCUMENTS

| 4,639,674 A | * | 1/1987 | Rippingale ................. 324/326 |
|---|---|---|---|
| 4,673,827 A | * | 6/1987 | Sommer | |
| 5,519,318 A | | 5/1996 | Koerner et al. ............. 324/252 |
| 5,561,368 A | * | 10/1996 | Dovek et al. ................ 324/252 |
| 5,850,624 A | * | 12/1998 | Gard et al. | |
| 5,994,880 A | * | 11/1999 | Dropps ........................ 320/140 |
| 6,037,776 A | * | 3/2000 | McGlone ..................... 324/345 |
| 6,124,712 A | | 9/2000 | Chaiken ...................... 324/326 |
| 6,150,809 A | * | 11/2000 | Tiernan et al. .............. 324/235 |

* cited by examiner

Primary Examiner—Walter E. Snow
(74) Attorney, Agent, or Firm—Sheridan Ross P.C.

(57) ABSTRACT

An instrument for geophysical measurement of magnetic field strength, using a GMR sensor is provided. The instrument achieves high sensitivity across a relatively wide bandwidth in an instrument which is small and lightweight. The instrument makes it feasible to obtain data, substantially simultaneously, at a plurality of locations and/or frequencies, thus not only reducing time requirements involved in measurements but reducing or eliminating the need for correcting data for changes in earth's magnetic fields. The instrument has relatively high vector sensitivity and relatively low power consumption.

53 Claims, 7 Drawing Sheets

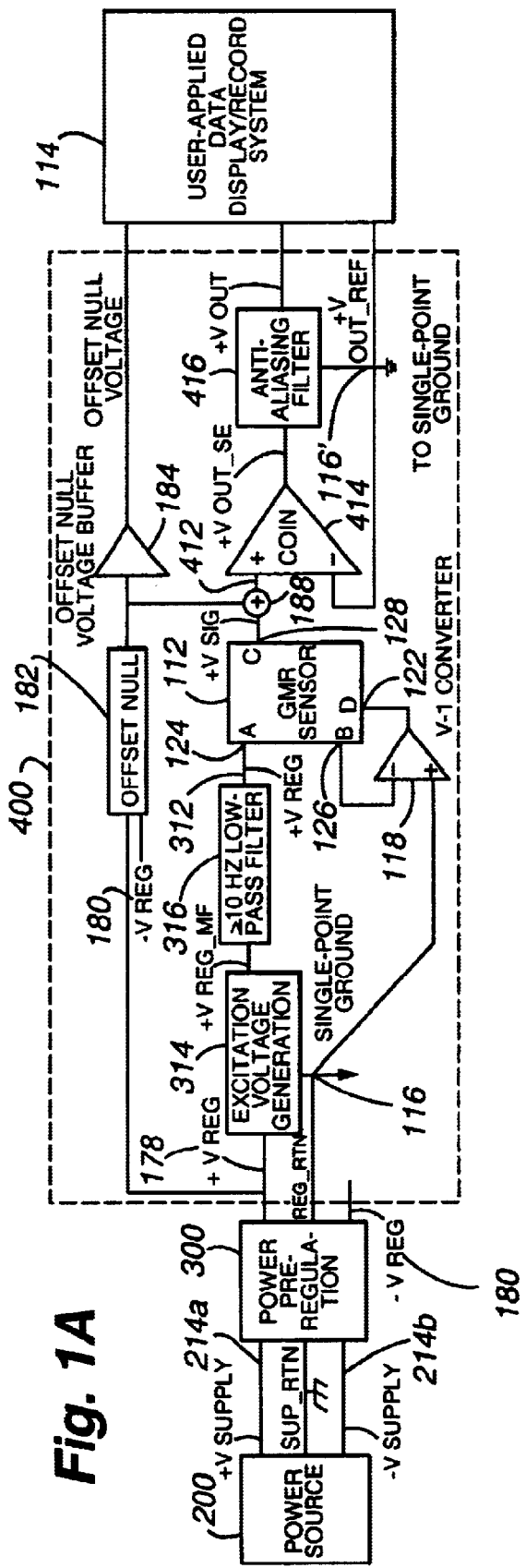
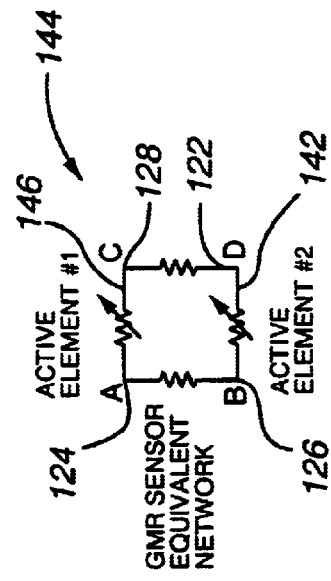
Fig. 1A
Fig. 1B

METHOD AND APPARATUS FOR EXPLORATION USING GMR SENSORS

The present application is a continuation of U.S. patent application Ser. No. 08/926,561, filed Sep. 10, 1997, which is incorporated herein by reference.

The present invention is directed to a method and apparatus for a giant magneto resistance (GMR) based instrument and in particular to a GMR instrument for geophysical exploration.

BACKGROUND INFORMATION

A number of instruments are used in connection with measuring magnetic fields for the purpose of geophysical exploration, such as for locating regions likely to contain minerals, petroleum, water, natural gas, hazardous materials or other items or materials of interest. In general, geophysical exploration instruments for detecting magnetic fields can be considered in two categories: "passive" systems for measuring a magnetic potential field (near-zero frequency field), sometimes referred to as magnetometers, and active field instruments in which a transmitter emits electromagnetic radiation (periodic or other time-varying radiation) which travels through a portion of a geologic formation and is detected at a second location by a receiver or detector instrument.

Previous potential field instruments and active field instruments have typically been cumbersome to properly locate in the field, for taking desired data. In some cases, instruments are cumbersome because of their physical size or mass, often involving relatively large coils which, previously, were believed necessary in such instruments in order to attain the desired sensitivity. In instruments intended for borehole measurements, size is particularly important because of the strong relationship between borehole diameter and cost. Many instruments used for borehole measurement of magnetic field strength were relatively fragile, such as those based on a tuned ferrite rod.

Some previous instruments require special environments such as cryogenic environments or elaborate calibration or initialization procedures. Such previous instruments requiring cumbersome positioning or setup have, therefore, required a substantial investment in personnel time for each data-gathering section. In many exploration techniques, it is necessary to obtain data at a plurality of spaced-apart locations (such as a number of points along a line or a number of points in a grid). The instrument cost or personnel cost may make it infeasible to position a plurality of instruments simultaneously along the line or grid and thus one or few instruments are positioned and, after taking the desired data moved to another location along the line or grid. Thus, the personnel time requirements for taking data in an extensive region can be relatively high.

In many previous systems, separate instruments were needed for measuring a potential field (near-zero frequency field) and measuring an electromagnetic field (time-varying field), each instrument typically requiring its own cumbersome placement or setup procedures.

Generally, collecting data at more than one frequency can be desirable since location of targets is facilitated depending on the target size and depth below surface (lower frequencies being used for deeper or larger targets) and since the response for given target may be different at different frequencies for other reasons as well (e.g., target composition, and physical conditions of temperature, pressure and the like). Many previous instruments (including, many coil instruments, typically used for surface-based measurement and ferrite rod sensors used, e.g. for borehole measurements) were configured to sense only a single frequency or relatively small band of frequencies. Other instruments were configured to sense a plurality of different discrete frequencies (or relatively small frequency bands), but, typically, could sense only one frequency (or frequency band) at a time, (i.e. were incapable of sensing multiple frequencies substantially simultaneously and were incapable of sensing a frequency continuum or wide band width of frequencies). Thus, in many previous systems, in order to obtain data at a plurality of frequencies, it was necessary to take data at a first frequency during the first time period, reconfigure or substitute instruments and then take data at a second frequency at a later time. This characteristic of such instruments further contributed to relatively large personnel time requirements for geophysical exploration.

An additional reason for desirability of wide bandwidth sensitivity for geophysical instruments relates to collection of active field data. For data analysis purposes, the source (transmitter) waveform is often assumed to have an idealized form, such as the square wave signal depicted in FIG. 6A, defining a period T 612 and, thus, a frequency $f=T^{-0.5}$. Although FIGS. 6A and 6B depict time-varying voltage signals, the source signal can also be a time-varying current signal, with appropriate changes in the receiving instrument.

In order to detect a signal having frequency f, the (typically fixed) sample frequency $f_s$ must comply with the Nyquist criterion:

$$f_s \geq 2f.$$

Preferably, the sample frequency will be about 20 to 50 times the source signal frequency.

In practice it is typically not feasible to provide a square wave source signal, as depicted in FIG. 6A, and in most cases, the source signal will be more similar to the waveform depicted in FIG. 6B, having a finite falling or edge transition period $t_f$ which thus defines a transition frequency $f_t \approx 0.35 (t_f)^{-0.5}$. Previous approaches had insufficient bandwidth to recover certain information, and typically performed data analysis by treating the source signal as if it were an idealized square wave signal (e.g. by ignoring the transition period). Such previous approaches thus failed to recover certain potentially useful information. In order to recover the integrity of the source signal of FIG. 6B, the detection instrument needs a system frequency response which can recover both f and $f_t$. Typically, previous coil-based receivers have had insufficient bandwidth to detect both frequencies substantially simultaneously.

The above-noted relatively high personnel time requirements associated with previous instruments not only adds to the cost and delay in geophysical measurements but can affect the quality of the data and the time needed for data processing. This is because the earth's ambient magnetic field in a given location (which represents a background signal to the signal being measured) can vary significantly in the time frame typically required to complete a series of measurements using previous instrumentation. For example, if data is collected at a plurality of locations along a line, at a plurality of times during the day, it may require significant post-collection data processing to discriminate between changes in potential fields or electromagnetic fields arising from geophysical items of interest and those that result from the natural variation of the earth's magnetic field during the day. The same data discrimination problem is faced with regard to measurements at different frequencies which, as noted above, typically must be collected at different times. Moreover, even with sophisticated data processing techniques, it is not always possible to reliably discriminate between field changes arising from geophysical phenomena and those arising from variations in the earth's magnetic field.

In many previous systems, it was difficult, expensive and/or time-consuming to obtain vector information. For example, although coil-type detectors can have some degree of vector sensitivity, they have been generally difficult to deploy as two or three vector receivers.

Many previous systems had relatively high power requirements for the receivers or sensors. Such high power requirements added to the difficulty of obtaining field data since a large power source had to be provided in often remote locations.

Accordingly, it would be useful to provide a geophysical sensor for potential fields or active electromagnetic fields which are relatively less cumbersome and costly to provide, locate and setup, but are, preferably, non-fragile and relatively rugged, have good vector sensitivity, relatively low power requirements, have a relatively wide bandwidth, can measure both "passive" potential fields and active electromagnetic fields, preferably simultaneously, have a relatively high sensitivity and/or are feasible for collecting data at a plurality of locations and/or frequencies, or across a frequency range, substantially simultaneously.

SUMMARY OF THE INVENTION

The present invention includes a recognition of the existence and nature of problems in previous approaches, including those summarized above. The present invention involves geophysical instrumentation using a sensor, or an array of sensors, which are based on the so-called giant magnetoresistive (GMR) effect. Preferably, sensors are provided having a relatively high sensitively (such as a sensitively of about ±2 microOersted ($\mu$Oe), and preferably a relatively high bandwidth, such as a bandwidth from about 0 Hz (DC) to about 4 MHZ or more.

In one embodiment, one or more sensors are positioned and potential field data and/or active field data are collected at a plurality of frequencies and/or locations, preferably substantially simultaneously. In one embodiment, a plurality of sensors are positioned at spaced-apart locations along a line or path which may be substantially horizontal (e.g. along the earth's surface) or substantially vertical (e.g. within a bore hole), or a plurality of sensors may be positioned at points across a two-dimensional region such as points of a grid defined across a region of the earth's surface. Transmitters of an active system may be positioned or located in two or more different configurations in order to achieve three-dimensional data (e.g. using triangulation methods).

BRIEF DESCRIPTION OF THE DRAWINGS

FIG. 1A is block diagram of a detector instrument according to one embodiment of the present invention;

FIG. 1B depicts an equivalent network of a GMR sensor;

DETAILED DESCRIPTION OF THE PREFERRED EMBODIMENTS

Figure 2:
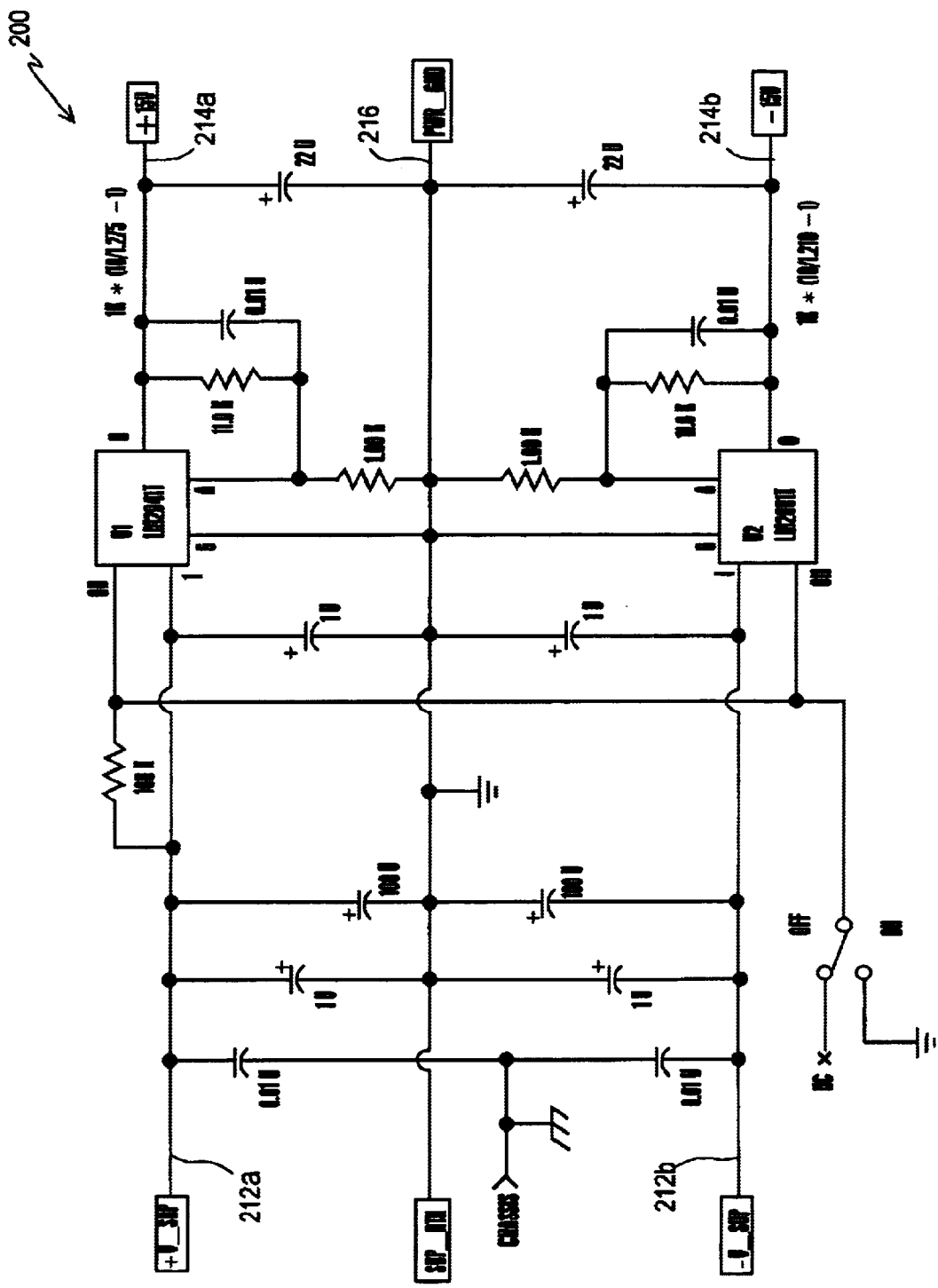
FIG. 2 is a schematic depiction of a power source portion of an instrument according to an embodiment of the present invention.
Figure 3:
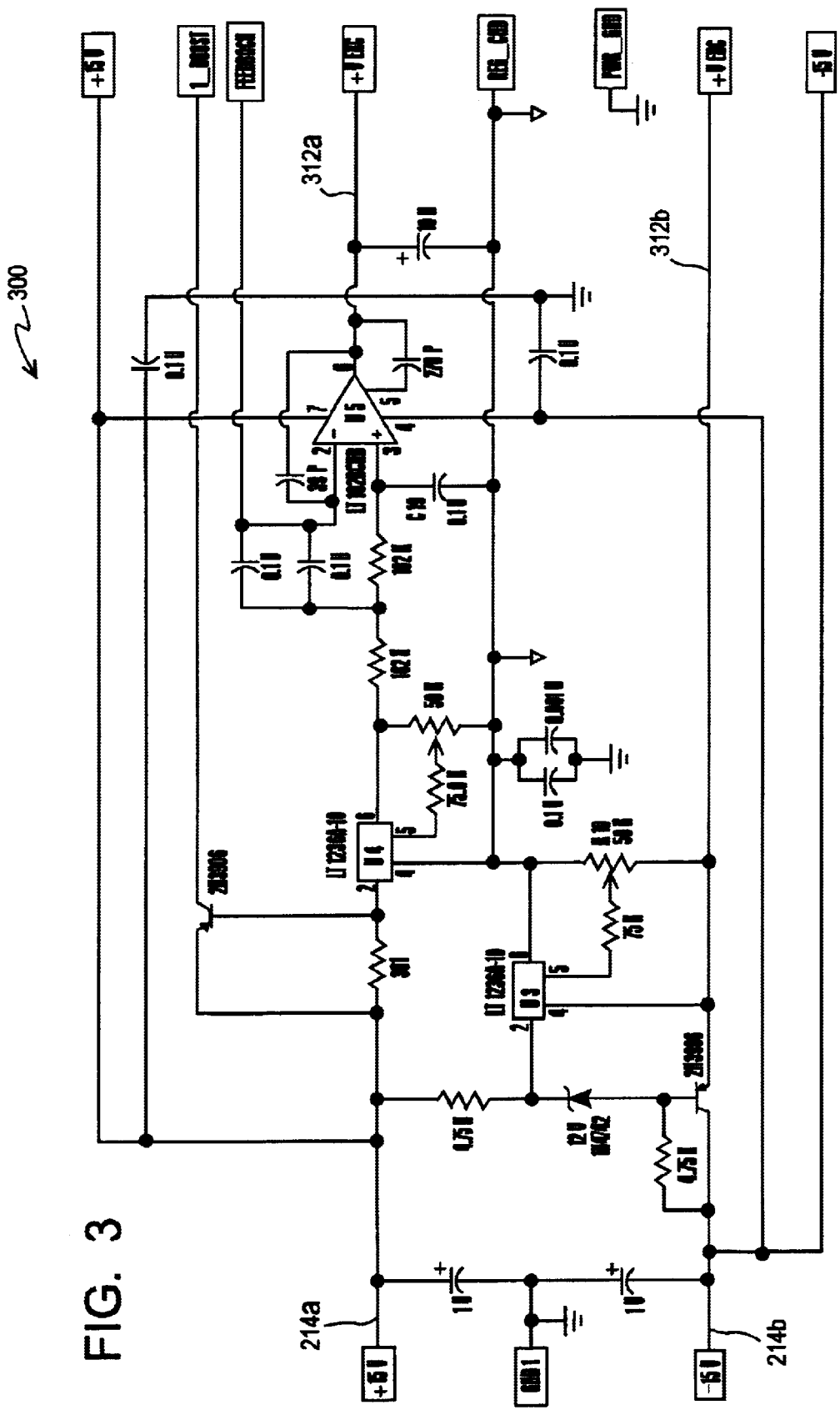
FIG. 3 is a schematic depiction of a power conditioning portion of an instrument according to an embodiment of the present invention.
Figure 4:
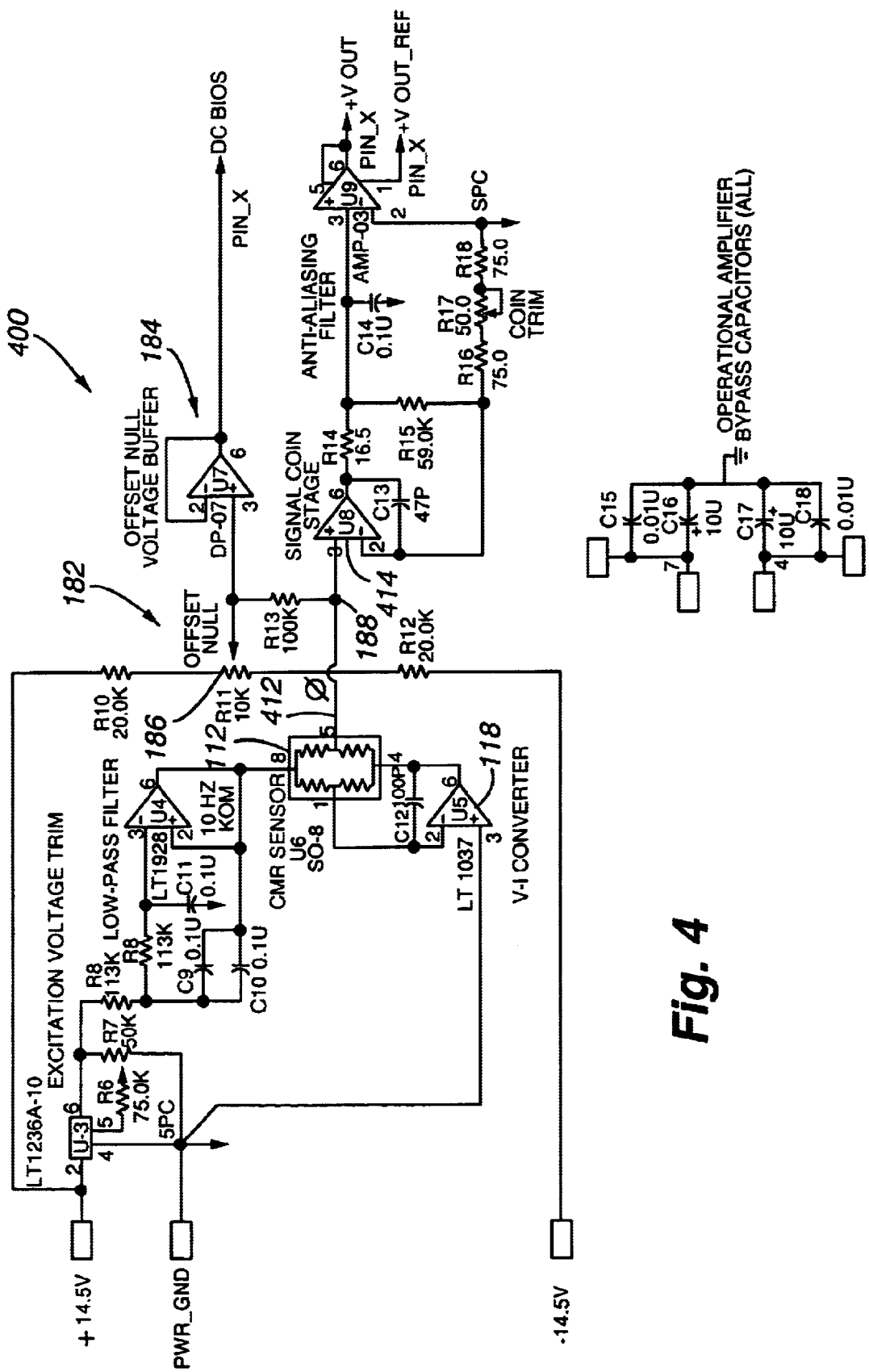
FIG. 4 is a schematic depiction of a sensor, amplifier and filter portion of an instrument according to one embodiment of the present invention.

As shown in FIG. 1, according to one embodiment, a detecting instrument 100 for measuring pertubations in magnetic field strength includes a power source 200 (an example of which, according to one embodiment, is depicted in greater detail in FIG. 2), power conditioning 300 (an example of which, according to one embodiment, is depicted in more detail in FIG. 3) and a sensor, amplifier and filter 400 (an example of which, according to one embodiment, is depicted in greater detail in FIG. 4). The filter at the output is optional, and, as depicted, is used for anti-aliasing. When such a filter is used, it will typically restrict the bandwidth of the instrument, such that the instrument bandwidth will be less than the sensor bandwidth.

An important component of the instrument in FIG. 1 is the giant magneto resistance (GMR) sensor 112. Although GMR sensors have been developed for various applications such as use in computer disk storage devices, vehicle guidance (e.g. for "smart highway" applications) and the like. GMR sensors developed for such other applications typically are intended to detect greater field strengths (compared to those detected in geophysical exploration applications) where high sensitivity can be detrimental. Sensors intended for such applications typically have had insufficient sensitivity to be suitable for most geophysical exploration applications. In particular, a previous GMR sensor typically had a sensitivity of, for example, about ±15 $\mu$Oe. In order to be used for most geophysical exploration applications, it is believed that the GMR sensor 112 should have a sensitivity of about ±50 $\mu$Oe, preferably about ±10 $\mu$Oe, more preferably about ±5 $\mu$Oe, even more preferably about ±2 $\mu$Oe and, most preferably, about ±1 $\mu$Oe.

Furthermore, for most geophysical exploration applications, in order to solve problems associated with previous approaches, it is believed that the GMR sensor 112 should preferably have a relatively large bandwidth of frequency response. Although, in some embodiments, the sensor may provide a bandwidth from substantially DC to 10 kHz or 50 kHz, in other embodiments, an even larger bandwidth is provided, such as a bandwidth of from about 0 Hz (DC) to about 100 KHz, preferably up to about 4 MHZ, more preferably up to about 50 MHZ and even more preferably up to about 100 MHZ.

Moreover, in order to solve problems associated with the previous instruments, it is believed preferable to provide an instrument in which the GMR sensor 112, and associated circuitry is relatively small, light-weight, rugged (non-fragile), requires no special environment (e.g. does not require a cryogenic environment) and requires little if any calibration or setup. Although sensor and/or instrument mass will depend on a number of factors, such as the particular application and the packaging used, in one embodiment, the sensor and associated circuitry have a mass, for a one-vector instrument, less than about 0.5 kg, preferably less than about 100 g, and more preferably less than about 50 g, and occupy a volume less than about 500 cm$^3$, preferably less than about 80 cm$^3$, preferably positionable in a bore hole with a diameter of about 2 inches (about 5 cm), and operates at a temperature above about 80° K, preferably above STP, more preferably above 70° C., more preferably 150° C., and even more preferably above about 250° C. or higher.

Although power consumption is affected by a number of factors, including sensitivity, in one embodiment, the sensor or receiver instrument has relatively low power consumption, such as less than about 300 milliWatts for a three-vector instrument, preferably, less than about 80 milliWatts. Such low power consumption is particularly significant when compared to instruments which need to be cooled, such as requiring cryogenic cooling, which typically has relatively large power consumption. For these purposes, a comparison may be made based on the total power consumption of the data collection system (including, for previous systems where it was used, cooling power, but not including the data collection/display computer or other data device), divided by the number of sensors in the system. For the present invention, the per-sensor system power consumption is preferably less than one Watt, preferably less than 100 milliwatts.

Preferably, the sensor or receiver instrument has relatively high vector sensitivity, such as achieving unwanted signal rejection of about 20 dB, preferably, about 30 dB, more preferably about 50 dB and even more preferably about 60 dB or more. Because the sensor is relatively small, it is feasible to place, e.g. three orthogonally-oriented sensors in a single instrument to provide for collecting 3-vector data substantially simultaneously.

Certain characteristics of a suitable GMR sensor are described, e.g., in "The Use of Giant Magnetoresistance Technology in Electromagnetic Geophysical Exploration" by T. David McGlone, published in The Proceedings of the Symposium on the Application of Geophysics to Engineering and Environmental Problems (SAGEEP), March 1997, Vol 2, p705–713, sponsored by the Environmental and Engineering Geophysical Society (EEGS) and "The Application of Thin-Film Magneto-Resistive Structures to a Non-Inductive Receiver for Electromagnetic Geophysical Exploration" by T. David McGlone, Colorado School of Mines, December, 1996, both of which are incorporated by reference.

In one embodiment, the GMR sensors 112 can be sensors such as those available from Nonvolatile Electronics of Eden Prarie, Minn.

As shown in FIG. 1A, the GMR sensor 112 receives excitation voltage at point A 124 using power source 200 and power conditioner 300. Preferably, all connections made to the Single Point Ground 116 (which is physically and electrically the same as the point 116' shown adjacent the anti-aliasing filter 416) are physically short and of low impedance. The V-I converter 118 holds point B 126 of the GMR sensor 112 to a nominal 0 volts. The symmetry of the GMR sensor will force point C 128 to also be at a nominal 0 volts (plus the desired, but small, signal voltage). This reduces the common-mode voltage restrictions on the circuit. The no-field voltage at point D 122 is ideally the inverse of the excitation voltage.

The output of the VI converter 118 drives the potential of point D 122 of the GMR sensor 112. Because active element number two 142 of the GMR sensor equivalent network 144 (depicted in FIG. 1B) is in the, feedback path of the V-I converter 118 (between points B 126 and D 122), the output voltage of the V-I converter at point D 122 varies with the applied magnetic field to be sensed. This variable voltage is reflected back to GMR sensor point C 128. Active element number one 146 of the GMR equivalent network (FIG. 1B) between points A 124 and C 128 is also active. Because point A 124 has a fixed potential driven by the excitation voltage generator, the variation in active element number one 146, due to a change in applied magnetic field, is also reflected to point C 128. The potential voltage at point C 128 is amplified and filtered before being output to a data display or recording system 114 which may be, for example, a computer, such as a personal computer, workstation computer or the like.

As shown in FIG. 2, a power supply 200 receives supply voltage 212a, 212b of between ±16 VDC and ±29 VDC and outputs voltages of, in this case +15V and −15V 214a, 214b with respect to ground 216.

As shown in FIG. 3, the power conditioning circuit 300 receives this voltage 214a, 214b and outputs excitation voltage 312a, 312b from a voltage generation 314 and low-pass (≦about 3 to 10 Hz) 316 filter. Filter 316 is useful in reducing high frequency noise to provide substantially noise-free excitation voltage through the sensor circuit 400. A current boost 318 is provided in order to reduce loading of the excitation voltage generator while maintaining a precise excitation voltage. A power preregulation 322 is provided in order to provide a relatively noise-free and stable voltage source to the excitation voltage source. Power supply variations and noise injected into the sensor become indistinguishable from a low level signal. By pre-regulating the source voltage, and low-pass filtering the source voltage, power supply variations and noise may be reduced, e.g. by about 75 dB or more, before encountering the excitation voltage generator which further reduces noise and fluctuations, e.g. by an additional 105 dB.

As can be seen from FIG. 4, the sensor circuit 400 is configured as a Wheatstone bridge which is, however, forced to a current mode rather than a voltage mode. The op-amp 414 is strapped across one leg of the bridge resulting in substantially linear response. The non-inverting input of the op-amp 414 is strapped to ground in order to eliminate common mode voltages.

Figure 7:
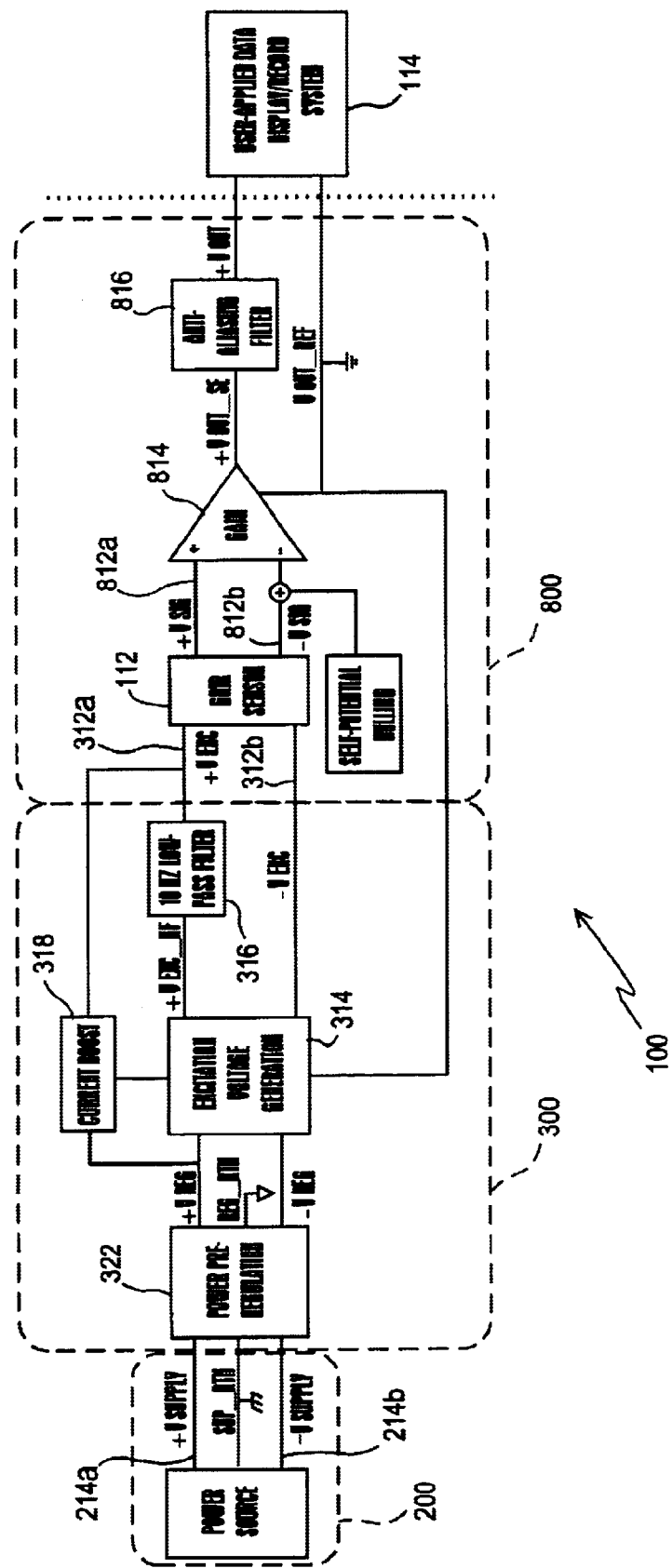
FIG. 7 is a block diagram of a detector instrument according to another embodiment of the present invention.

FIG. 7 shows another embodiment of the present invention. Similarly to the embodiment of FIG. 1, the GMR sensor 112 receives excitation voltage provided using a power source 200 and power conditioner 300. Output from the GMR sensor 112 is preferably amplified and filtered 800 before being output to a data display or recording system 114 which may be, for example, a computer such as a personal computer, workstation computer or the like.

Referring again to FIGS. 1A and 4, the filter 400 further makes provisions for nulling the ambient magnetic field to increase instrument sensitivity to the field pertubations of interest. To null out the ambient magnetic field, the filter 400 comprises null circuitry. The null circuitry includes a regulated voltage +V REG 178 which is an output of power conditioning circuit 300 and −V REG 180, offset null 182 which provides a null signal (that is adjustable using variable resistor 186), offset null voltage buffer 184, and summing block 188 (or signal combiner) which sums the signal at GMR sensor point C 128 with the null signal to provide a nulled output to the op-amp 414. As will be appreciated by one of ordinary skill in the art, the magnitude of the null signal is proportional to the strength of the ambient magnetic field. These components provide an output V OUT having a magnitude that is proportional to the magnitude of the pertubation in the magnetic field.

Figure 8:
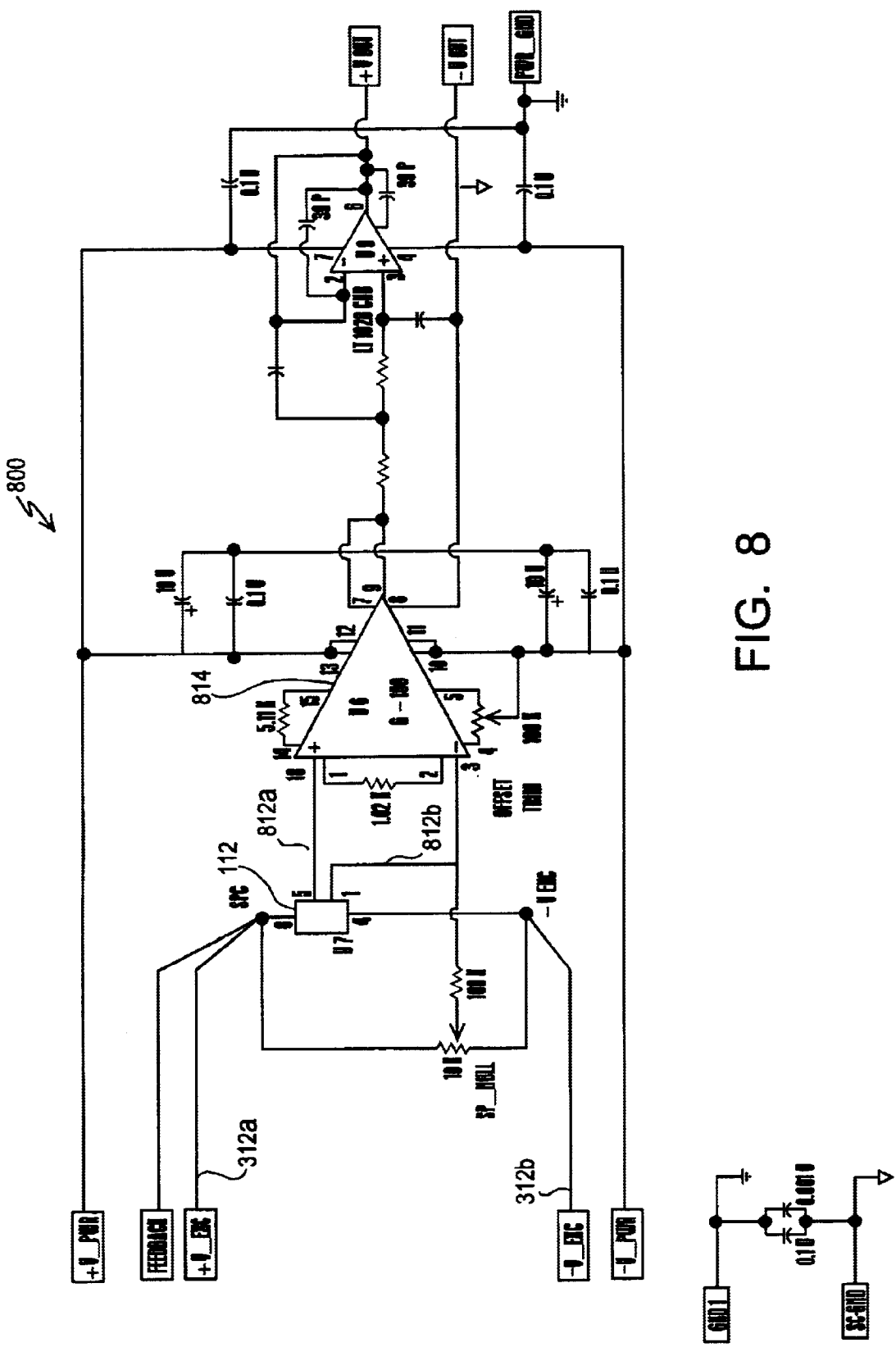
FIG. 8 is a schematic depiction of a sensor, amplifier and filter portion of an instrument according to the embodiment of FIG. 7.

As depicted in FIG. 8, the excitation voltage 312a, 312b is provided to the sensor, 112 which outputs signal voltage 812a, 812b proportional to the strength of an applied magnetic or electromagnetic field. This voltage is applied to an amplifier such as op-amp 814. The output from the op-amp 814 is provided to an anti-aliasing filter 816 before being output to the data display and recording system 114.

Figure 5:
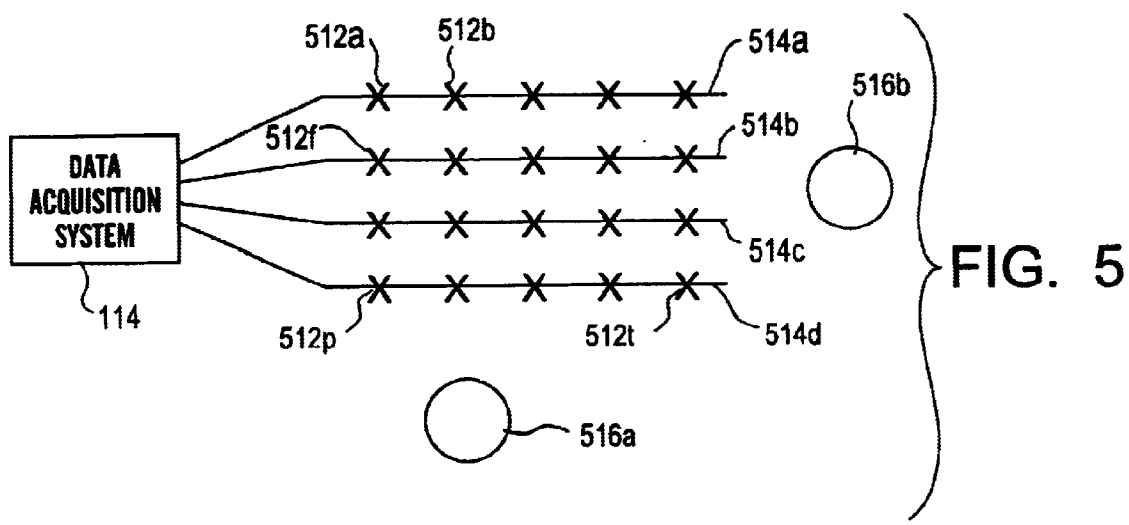
FIG. 5 is a top plan depiction of a two-dimensional sensor array according to a embodiment of the present invention.

In use, at least one and preferably a plurality of instruments such as those depicted in FIGS. 1–4 are located at a plurality of positions 512a–512t along a path or across an area (FIG. 5). In one embodiment, the instruments are miniaturized (such as being embodied in one or more integrated circuits or chips) and a plurality of such instruments are coupled to a length of one or more signal wires 514a–d and positioned such as by unrolling a coiled sensor wire in the desired location. The sensor wires 514a–d are coupled to a data display/recording device 114 and excitation voltage is supplied to the sensors while the data display/recording device outputs or records data indicative of the potential field at the plurality of instrument locations 512a–512t, substantially simultaneously.

In situations in which active field data is desired, one or more electromagnetic field transmitters (of types well known in the art) are positioned at a location 516a spaced from the sensor locations 512a–t. The sensors each output data indicative of electromagnetic field strength at a plurality frequencies, preferably across a substantially continuous spectrum of frequencies and, preferably, substantially simultaneously with measurement of the potential field (near-zero frequency) strength.

When three-dimensional information is desired, the transmitter may be repositioned at a new, preferably orthogonal (with respect to the sensor array) location 516b and the resultant data combined with the data from the originally-located transmitter, using well-known triangulation methods to deduce three-dimensional field strength data.

As seen from the above description, since it is feasible, using the present instruments to obtain data substantially simultaneously at a number of locations and/or at a number of frequencies (or over a relatively wide frequency bandwidth) all of the data necessary for the desired geophysical exploration can be obtained in a relatively short period of time, resulting not only in reducing the personnel time required for placement, setup and data collection but also reducing or eliminating the need to correct for changes in the earth's magnetic field, since the required measurements can be obtained over a time period short enough that changes in the earth's magnetic field are relatively insignificant. The wide detection frequency bandwidth which is possible with the present invention makes it feasible to make use of the transition period by measuring its frequency $f_t$.

Figure 6A:
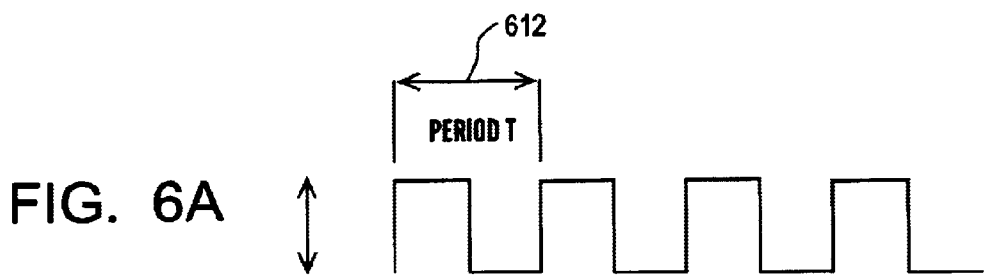
FIG. 6A is a diagram of an idealized source signal showing voltage versus time.
Figure 6B:
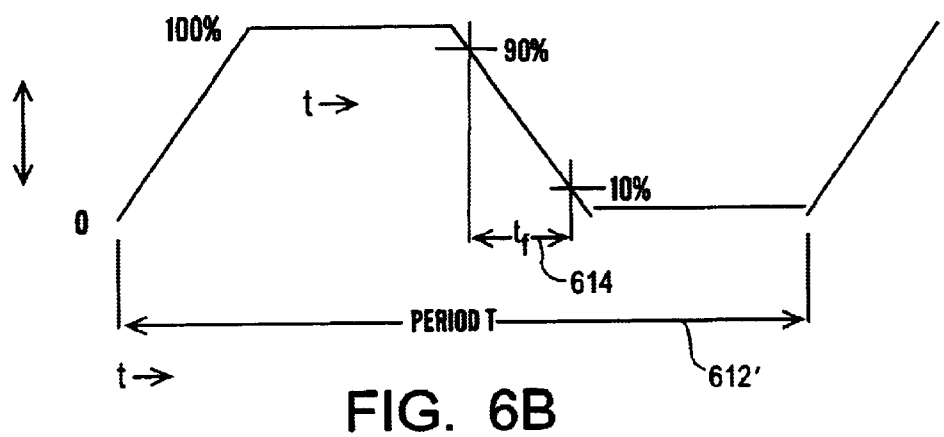
FIG. 6B is a diagram of a period of a source signal with an exaggerated depiction of the transition edge, showing voltage versus time.

In light of the above description, a number of advantages of the present invention can be seen. The present invention provides an effective geophysical sensor which is relatively small, lightweight, low-cost, rugged and thus relatively easy and quick to locate in multiple positions, either successively or simultaneously. The present sensor requires no special temperature or other operating conditions and requires little if any calibration or other setup. The present sensor is able to obtain both passive (near-zero frequency) and active (electromagnetic field) measurements, substantially simultaneously, using a single instrument. The present invention is able to achieve relatively high measurement sensitivity at relatively low instrument cost and high measurement convenience. The present invention provides good vector sensitivity. The present invention can be configured to provide relatively low power consumption. The present invention can provide data which requires a significantly reduced amount of post-collection data processing, and in particular can eliminate or reduce the need for corrections as a result of changes in the earth's magnetic field. The present invention has a relatively wide bandwidth allowing measurement at multiple frequencies and, preferably, across a substantially continuous spectrum of frequencies, substantially simultaneously, without changing or reconfiguring the instrument. Preferably, the instrument has sufficient bandwidth to detect both the primary frequency f and transition frequencies $f_t$ (FIGS. 6A and 6B). Furthermore it is noted that, to reconstruct the sine wave equivalent frequency f, it is necessary to sample at least twice during the source signal period T. Preferably, the instrument of the present invention has sufficient bandwidth that, by dynamically changing the sample period during the transition period $t_f$, both the frequency domain signal f and the time domain signal $f_t$ can be detected. It is believed that previous approaches, particularly those using coils for detection sensors, had insufficient bandwidth to recover both f and $f_t$.

A number of variations and modifications of the invention can also be used. The present invention can be configured with up to three (or more) components and configured to detect up to three dimensions, depending on the set-up of the geophysical survey and version of the instrument. For example, the invention can be configured as a three-component, two-dimensional and/or three-dimensional electromagnetic array system. The present invention can be configured to achieve joint frequency and time domain analysis. Although the depicted embodiment is configured to respond to a time-varying voltage source, the invention can be configured to respond to a time-varying current source. Although the detection instrument provides a voltage mode output, a current mode output can be used. Although the depicted embodiment is configured with single-ended output, the invention can be used in connection with a differential output. The present invention can be configured to accommodate borehole measurement applications such as frequency-tunable borehole measurements. The instrument's amenability to configuration in a small, easily portable size makes the instrument useful for a number of purposes and in a number of modes of deployment. For example, the instrument may be deployed as a static installation, such as for environmental monitoring of holding ponds for waste products, in a mobile use, such as allowing a user to walk with the instrument an take a measurement at selected locations (e.g. by pushing a button). The invention can be used in connection with metal detectors, including detectors for use by hobbyists (e.g. by configuring the instrument with current mode output for driving a center-null indicator). The invention can be used in connection with ground-based vehicle monitoring (e.g. where measurements are taken from a truck or the like), as well as deployment in air- or spacecraft, e.g. depending on the desired traffic. The present invention can be configured to achieve relatively shallow time-domain measurements such as on the order of about 20 nanoseconds. The present invention provides sufficient detection frequency bandwidth to permit use in connection with complex or sophisticated source signals. Wide bandwidth allows feasibility of exotic signal sources such as chirp sources (similar to those used in radar processing). The square wave signals previously discussed may define a signal envelope. For example, a 1 Hz square wave may define an envelope within which a sine wave is swept e.g. from 100 Hz to 1 kHz, allowing a quasi-continuous spectrum to be measured over the swept frequency range.

Although the present invention has been described by way of a preferred embodiment and certain variations and modifications, other variations and modifications can also be used, the invention being defined by the following claims.

What is claimed is:

1. An exploration instrument comprising:
   a GMR sensor;
   an excitation circuit coupled to said sensor, wherein said excitation circuit supplies a DC voltage to said GMR sensor; and
   a signal combiner coupled to said GMR sensor, wherein said signal combiner removes an ambient planetary magnetic field component from a GMR output signal and wherein said sensor has a bandwidth with an effective upper limit greater than about 50 MHZ.

2. The instrument of claim 1 wherein said GMR has a sensitivity and said sensitivity is better than about ±2 microOersted.

3. The instrument of claim 2 wherein said sensitivity is better than about ±1 microOersted.

4. The instrument of claim 1 wherein said sensor has a mass of less than about 500 grams.

5. The instrument of claim 1 wherein said sensor occupies a volume of less about.

6. The instrument of claim 1 wherein said sensor has a bandwidth with an effective upper limit greater than about 100 kHz, wherein the GMR sensor provides a GMR output, and wherein the GMR output is substantially linearly responsive.

7. The instrument of claim 1 wherein said sensor has a bandwidth with an effective upper limit greater than about 4 MHZ.

8. The instrument of claim 1 wherein said effective upper limit is greater than about 100 MHZ.

9. The instrument of claim 1 wherein said sensor has a bandwidth with a lower range extending substantially to DC.

10. The instrument of claim 1 wherein said excitation circuit comprises a filter for providing a substantially noise-free excitation signal to said sensor.

11. The instrument of claim 10 wherein said filter passes substantially only frequencies below about 10 Hz.

12. The instrument of claim 10 wherein said filter passes substantially only frequencies below about 7 Hz.

13. The instrument of claim 10 wherein said filter passes substantially only frequencies below about 3 Hz.

14. The instrument of claim 1 further comprising means for providing anti-aliasing to an output of said sensor.

15. An exploration instrument comprising:
    a GMR sensor having at least a first output means;
    means for providing a conditioned DC excitation signal to said sensor;
    means for removing from an output signal outputted by said first output means a component that is proportional to an ambient magnetic field to form an adjusted signal;
    means for amplifying said adjusted signal; and
    means for filtering said adjusted signal.

16. An instrument, as claimed in claim 15, wherein said sensor forms a leg of a Wheatstone bridge and further comprising:
    means for providing a substantially linearly responsive adjusted signal.

17. An instrument, as claimed in claim 16 wherein said means for amplifying is coupled across a leg of said Wheatstone bridge to provide a substantially linearly responsive output signal.

18. A system for detecting magnetic fields adjacent a target region, comprising:
    a plurality of detectors, each detector having at least one GMR sensor coupled to an excitation circuit, said detectors positioned at spaced-apart locations on or below the surface adjacent to the target region; and
    communication links conveying output from said detectors to a data collection device, wherein said output is proportional to a perturbation in a magnetic field strength.

19. A system, as claimed in claim 18, wherein said communication links comprise cables.

20. A system, as claimed in claim 18, wherein said data collection device comprises a computer and wherein the output is substantially linearly responsive.

21. A system, as claimed in claim 18, wherein said plurality of detectors are positioned along a substantially one-dimensional path.

22. A system, as claimed in claim 18, wherein said plurality of detectors are positioned across a two-dimensional region.

23. A system for detecting magnetic fields adjacent a target region, comprising:
    a plurality of detectors, each detector having at least one GMR sensor coupled to an excitation circuit, said detectors positioned at spaced-apart locations adjacent to a target region, each said detector having a mass of less than about 0.5 kg;
    communication links conveying output from said detectors to a data collection device;
    said detectors operating above about 80° K, providing a sensitivity of better than about ±10 microOersted and a bandwidth from substantially DC to about 4 MHZ and having sufficient vector sensitivity to provide a rejection of at least about 30 dB, wherein said output is proportional to a perturbation in a measured magnetic field.

24. An exploration method, comprising:
    providing at least a first GMR sensor;
    locating said first sensor at a first location; and
    measuring a perturbation in magnetic field strength at said first location using said first sensor, indicative of a geophysical characteristic of a selected region through which said magnetic field passes.

25. An exploration method, as claimed in claim 24, wherein said step of measuring includes measuring a potential field and a time-varying field strength substantially simultaneously.

26. An exploration method, as claimed in claim 24, wherein said step of measuring includes measuring at a plurality of frequencies substantially simultaneously.

27. An exploration method, as claimed in claim 24, wherein said step of measuring includes measuring at a continuum of frequencies between about 0 Hz and about 4 MHz and wherein a response of the at a first GMR sensor is substantially linearly responsive.

28. A method for measuring a magnetic field, comprising:
    providing a plurality of GMR sensors;
    locating said plurality of sensors at a plurality of locations;
    measuring a magnetic field strength at said plurality of locations, substantially simultaneously, using said plurality of sensors; and removing an ambient magnetic field strength from the measured magnetic field strengths.

29. A method for measuring a magnetic field, comprising:
providing a plurality of detectors, each detector having at least one GMR sensor coupled to an excitation circuit, each said detector having a mass of less than about 0.5 kg;
said detectors operating above about 80° K, providing a sensitivity of better than about ±10 microOersted and a bandwidth from substantially DC to about 4 MHZ and having sufficient vector sensitivity to provide a rejection of at least about 30 dB;
locating said plurality of sensors at a plurality of locations on or below a celestial body's surface;
measuring a magnetic field strength at said plurality of locations, substantially simultaneously, using said plurality of sensors; and
adjusting the measured magnetic field strength to provide a perturbation in magnetic field strength relative to an ambient magnetic field strength.

30. The method of claim 28, further comprising the step of:
providing a substantially linearly responsive output from each of the plurality of detectors.

31. The method of claim 29, further comprising the step of:
providing a substantially linearly responsive output from each of the plurality of detectors.

32. An exploration instrument comprising:
a GMR sensor providing a GMR output;
an excitation circuit coupled to said sensor, wherein said excitation circuit supplies a DC voltage to said GMR sensor, wherein the GMR output is a substantially linearly responsive signal.

33. The instrument of claim 32, further comprising:
a signal combiner coupled to said GMR sensor, wherein said signal combiner removes an ambient magnetic field component from a GMR output signal.

34. The instrument of claim 32, wherein the GMR sensor has a sensitivity of better than about +50 µOe, a bandwidth from substantially DC to about 4 MHZ and having sufficient vector sensitivity to provide a rejection of at least about 30 dB.

35. The instrument of claim 32, wherein the instrument measures at a plurality of frequencies substantially simultaneously and a potential field and a time-varying field strength substantially simultaneously.

36. A method for measuring a magnetic field, comprising:
providing at least a first GMR sensor;
measuring a magnetic field strength, substantially simultaneously, using said at least a first GMR sensor; and
providing a substantially linearly responsive output signal from the at least a first GMR sensor.

37. The method of claim 36, further comprising:
removing an ambient magnetic field component from the output signal.

38. The instrument of claim 36, wherein the at least a first GMR sensor has a sensitivity of better than about +50 µOe, a bandwidth from substantially DC to about 4 MHZ and having sufficient vector sensitivity to provide a rejection of at least about 30 dB.

39. The instrument of claim 36, wherein in the measuring step the instrument measures at a plurality of frequencies substantially simultaneously and a potential field and a time-varying field strength substantially simultaneously.

40. An exploration instrument comprising:
a GMR sensor;
an excitation circuit coupled to said sensor, wherein said excitation circuit supplies a DC voltage to said GMR sensor; and
a signal combiner coupled to said GMR sensor, wherein said signal combiner removes an ambient magnetic field component from a GMR output signal and wherein said GMR has a sensitivity and said sensitivity is better than about ±2 microOersted.

41. The instrument of claim 40 wherein said sensitivity is better than about ±1 microOersted.

42. An exploration instrument comprising:
a GMR sensor;
an excitation circuit coupled to said sensor, wherein said excitation circuit supplies a DC voltage to said GMR sensor; and
a signal combiner coupled to said GMR sensor, wherein said signal combiner removes an ambient magnetic field component from a GMR output signal and wherein said sensor has a mass of less than about 500 grams.

43. An exploration instrument comprising:
a GMR sensor;
an excitation circuit coupled to said sensor, wherein said excitation circuit supplies a DC voltage to said GMR sensor; and
a signal combiner coupled to said GMR sensor, wherein said signal combiner removes an ambient magnetic field component from a GMR output signal and wherein said sensor occupies a volume of less about 300 cm$^3$.

44. An exploration instrument comprising:
a GMR sensor;
an excitation circuit coupled to said sensor, wherein said excitation circuit supplies a DC voltage to said GMR sensor; and
a signal combiner coupled to said GMR sensor, wherein said signal combiner removes an ambient magnetic field component from a GMR output signal and wherein the GMR sensor provides a GMR output, and wherein the GMR output is substantially linearly responsive.

45. An exploration instrument comprising:
a GMR sensor;
an excitation circuit coupled to said sensor, wherein said excitation circuit supplies a DC voltage to said GMR sensor; and
a signal combiner coupled to said GMR sensor, wherein said signal combiner removes an ambient magnetic field component from a GMR output signal and wherein said sensor has a bandwidth with an effective upper limit greater than about 4 MHZ.

46. The instrument of claim 45, wherein said sensor has a bandwidth with an effective upper limit greater than about 50 MHZ.

47. The instrument of claim 46, wherein said sensor has a bandwidth with an effective upper limit greater than about 100 MHZ.

48. An exploration instrument comprising:
a GMR sensor;
an excitation circuit coupled to said sensor, wherein said excitation circuit supplies a DC voltage to said GMR sensor; and a signal combiner coupled to said GMR sensor, wherein said signal combiner removes an ambient magnetic field component from a GMR output signal and wherein said sensor has a bandwidth with a lower range extending substantially to DC.

49. An exploration instrument comprising:

a GMR sensor;

an excitation circuit coupled to said sensor, wherein said excitation circuit supplies a DC voltage to said GMR sensor and comprises a filter for providing a substantially noise-free excitation signal to said sensor; and a signal combiner coupled to said GMR sensor, wherein said signal combiner removes an ambient magnetic field component from a GMR output signal.

50. The instrument of claim 49, wherein said filter passes substantially only frequencies below about 10 Hz.

51. The instrument of claim 49, wherein said filter passes substantially only frequencies below about 7 Hz.

52. The instrument of claim 49, wherein said filter passes substantially only frequencies below about 3 Hz.

53. An exploration instrument comprising:

a GMR sensor;

an excitation circuit coupled to said sensor, wherein said excitation circuit supplies a DC voltage to said GMR sensor;

a signal combiner coupled to said GMR sensor, wherein said signal combiner removes an ambient magnetic field component from a GMR output signal; and means for providing anti-aliasing to an output of said sensor.

* * * * *